United States Patent Office 3,530,583
Patented Sept. 29, 1970

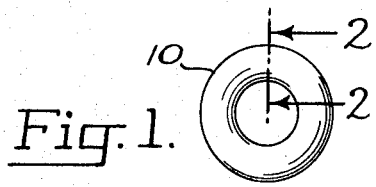
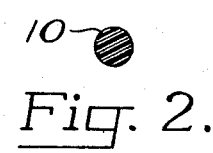
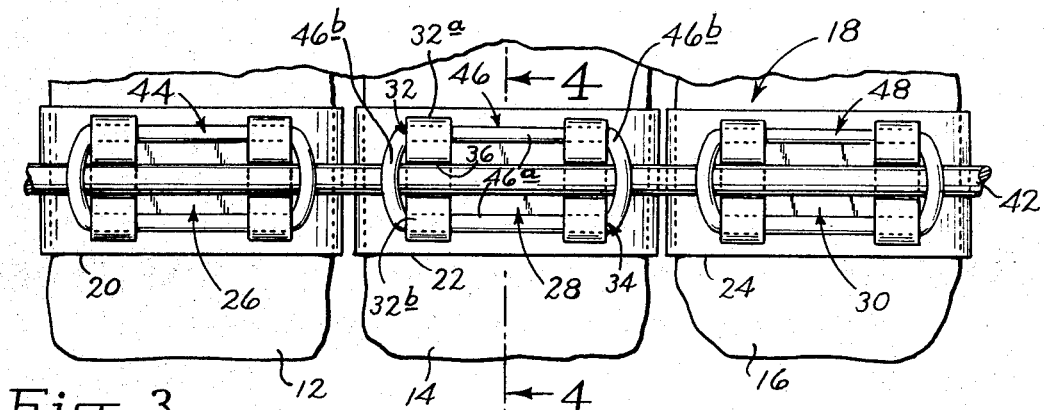
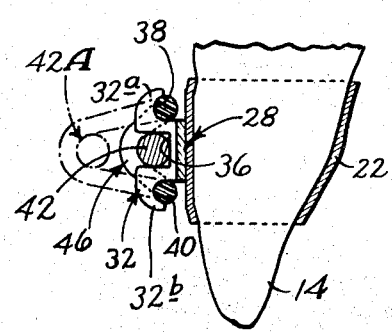
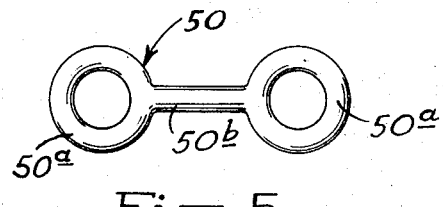
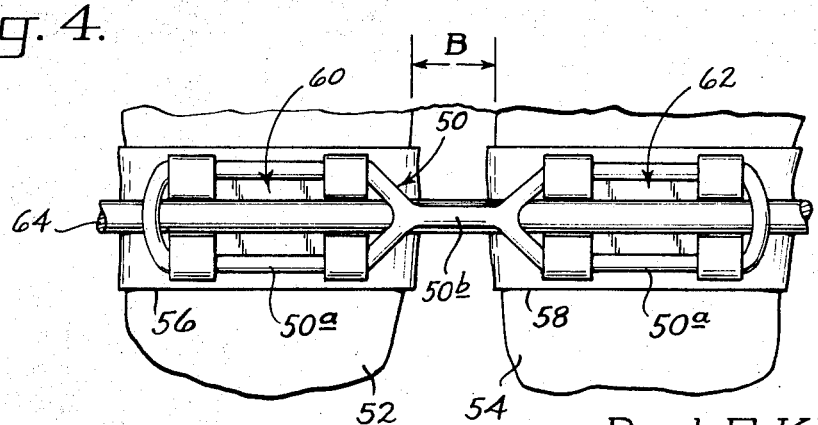
Paul E. Klein
Roland M. Anderson
INVENTORS Paul E. Klein
Roland M. Anderson
INVENTORS
BY Kolisch & Hartwell
Attys.

3,530,583
TRACTIVE MEANS FOR USE WITH ORTHODONTIC APPARATUS
Paul E. Klein, 928 Lake Shore Road, Lake Oswego, Oreg. 97034, and Roland M. Anderson, 2770 SW. 107th Ave., Portland, Oreg. 97225
Filed Apr. 24, 1967, Ser. No. 632,961
Int. Cl. A61c 7/00
U.S. Cl. 32—14                            7 Claims

ABSTRACT OF THE DISCLOSURE

Devices for use with orthodontic apparatus to produce tractive forces and to assist in tooth positioning, such devices being made of a durable, elastomeric, mouth-fluid-resistant material and being formed in an endless connector loop having a smooth nonangular surface.

---

The present invention relates to orthodontic apparatus, and more particularly to tractive means which may be employed with such apparatus to assist in tooth positioning.

The usual orthodontic apparatus employs metal bands, or attachments, which are anchored or mounted on a person's teeth. Each band is provided with a bracket through which forces may be exerted on a tooth via a band. Commonly there is employed with each set of banded teeth an elongated resilient wire, known as an arch wire, which is tied to the bracket of each band by a wire ligature that passes around the arch wire and bracket. The arch wire is preformed in such a manner that when tied to the various brackets, it exerts predetermined tractive tooth-positioning forces on the various teeth.

Where tractive forces are required that cannot readily be transmitted through ligature wires employed as mentioned above, rubber bands are often used to produce such forces with such bands connected to appropriate catches or hooks provided in the apparatus. For example, such bands are employed sometimes to produce intermaxillary forces for adjusting the relative positions of a person's jaws, and sometimes to produce intramaxillary forces for moving two teeth toward one another along the same jaw.

Wire ligatures and rubber bands as means for transmitting tractive forces in the mouth of a person are known to have a number of deficiencies. The former are relatively difficult and time-consuming to attach properly, since each ligature must be carefully wound around the bracket and arch wire with ends of the ligature twisted into a pigtail to secure it in place. To avoid accidental loosening, such a ligature must be wound relatively tightly about an arch wire and bracket, and tight winding often results in undesired distortion of an arch wire. Also, tight winding can result in too great an application of force to a tooth, and discomfort to the patient.

A further problem with a wire ligature is that when its trailing ends are cut off beyond the pigtail (as is usually the case) this results in sharp-ended projections which frequently irritate mouth tissue. Ligatures are also not reusable.

Considering rubber bands, these are greatly affected by fluids which exist in a person's mouth, and such bands deteriorate markedly after only a few hours of use. With deterioration, the bands lose their elasticity and are ineffective to produce tractive forces. Thus, continual regular replacement of bands is required. Often, however, because of the inconvenience entailed, patients forget or refuse to replace bands on a regular basis.

A further problem with rubber bands is that they are relatively nondurable, and thus abrade, tear and break easily. With stretching of the usual rubber band, fissures and discontinuities in the band's surface develop which significantly weaken the band. Additionally, such bands usually have rough edges which irritate mouth tissue.

A general object of the present invention is to provide, for use with orthodontic apparatus, novel tractive devices which overcome the above-indicated deficiencies of known wire ligatures and rubber bands.

More particularly, an object of the invention is to provide tractive devices which may rapidly and easily be mounted on orthodontic apparatus, and which are durable and highly resistant to mouth fluids.

A further object is to provide such devices which will cause minimal irritation to mouth tissue.

To accomplish these objects, the invention features, in one embodiment, an endless connector loop which is adapted operatively to interconnect an arch wire and the bracket of a tooth attachment (metallic band) mounted on a tooth. The connector loop is formed of a tough, elastomeric, mouth-fluid-resistant material which resists abrasion and tearing. The loop is easily stretched in place over an arch wire and around a bracket, and in operative position produces a continually-acting tractive force urging the arch wire and bracket (and hence the tooth) together. Even over long periods of use, the loop contemplated herein remains intact, and continues to produce a tractive force without any appreciable loss of elasticity.

The loop according to the invention does not have to be severed and tied and hence no sharp edges are present. Further, the loop has a relatively smooth, nonangular outer surface which remains smooth even with use, and thus, irritation to mouth tissue is minimized.

In a modified form of tractive device, a pair of spaced connector loops, similar to the kind just mentioned, are joined by an elongated filament which is formed integrally with the loops. With such a device, each connector loop may be employed to interconnect an arch wire and a tooth attachment bracket (as above described), or it may be connected to a suitable catch or hook provided in the apparatus. In operative position, the filament of the device is tensed to produce a tractive force urging the two connector loops, and the parts of the apparatus to which the loops are connected, toward one another.

Another modified form of tractive device is similar to the one just described, but employs three or more connector loops. Adjacent loops are joined through filaments such as the one mentioned above. This form of device may employed to produce tractive forces simultaneously on three or more teeth.

A further object of the invention is to provide tractive devices of the kind so far described which may readily be employed with presently available tooth attachments, brackets and arch wires.

Still another object is to provide such devices which are reusable.

These and other objects and advantages attained by the invention will become more fully apparent as the following description is read in conjunction with the accompanying drawings, wherein:

FIG. 1 illustrates one embodiment of a tractive device constructed according to the invention;

FIG. 2 is an enlarged cross-sectional view taken along the line 2—2 in FIG. 1;

FIG. 3 is a fragmentary front elevation, on the same scale as FIG. 1, illustrating several upper front teeth, and showing how the device of FIG. 1 may be used with orthodontic apparatus to apply forces to such teeth;

FIG. 4 is a cross-sectional view taken along the line 4—4 in FIG. 3 illustrating various positions for an arch wire and tractive device employed in FIG. 3;

FIG. 5 illustrates a modified form of tractive device;

FIG. 6 is a fragmentary side elevation, on the same scale as FIG. 5, showing a pair of spaced upper incisor teeth, and illustrating how the device of FIG. 5 may be employed to urge such teeth toward one another;

Figure 7:
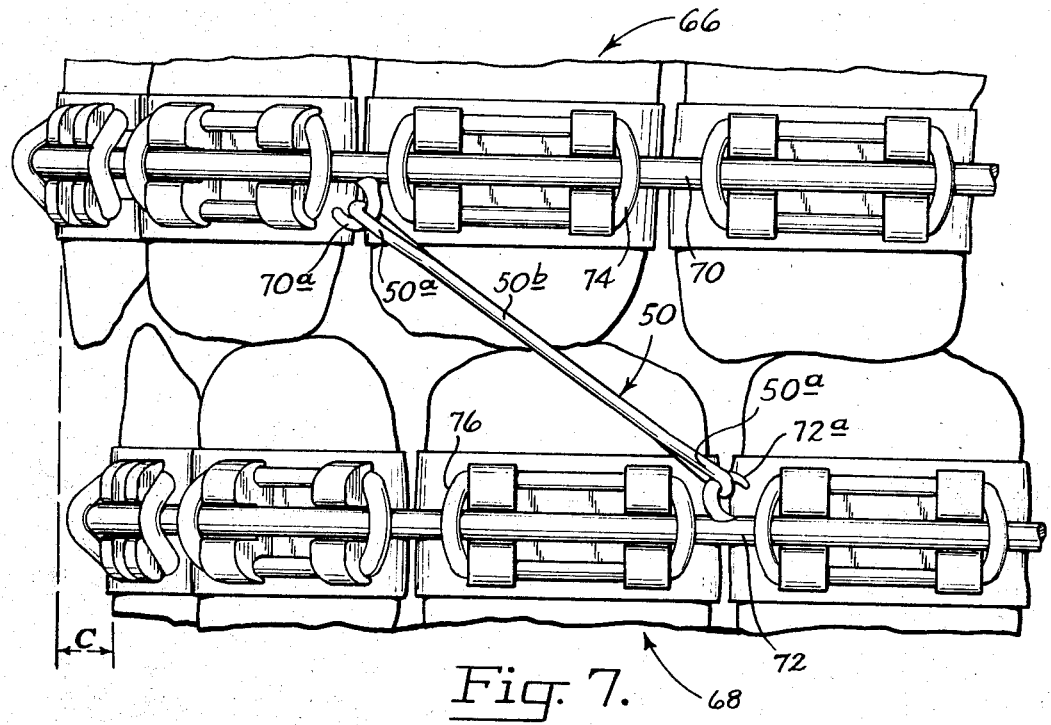
FIG. 7 is a fragmentary side elevation, also on the same scale as FIG. 5, showing teeth in an upper jaw and a lower jaw, illustrating another use of the device of FIG. 5, and also showing how the devices of FIGS. 1, 5 may be used together with orthodontic apparatus.

Turning now to the drawings, and referring first to FIGS. 1 and 2, shown at 10 is one embodiment of tractive means as contemplated herein taking the form of an endless, somewhat doughnut-shaped connector loop. The loop is formed in any suitable manner, e.g., by injection molding, as a unitary structure of a tough, elastomeric, mouth-fluid-resistant material which is capable of enduring relatively long periods of use in a mouth without any appreciable deterioration. The material forming the loop is capable, even over periods of many weeks of continuous use, of withstanding the usual abrasive and other cutting action that occurs in a month. It is also capable, over comparable periods of time, of retaining substantially its full elasticity in the presence of mouth fluids.

A material which has been found satisfactory for this purpose comprises an elastomeric, thermoset-thermoplastic, polyester-based, isocyanate terminated, urethane resin. Resins of this type are commercially available.

Further describing loop 10, it is formed with a relatively smooth, nonangular, nonabrasive outer surface, and, as can be seen clearly in FIG. 2, preferably has a nonangular, substantially circular cross-sectional outline. While a circular outline has been chosen to simplify construction of the loop, it is contemplated that other nonangular outlines are possible. With such construction, the loop, when used in a person's mouth, causes minimal irritation to mouth tissue. Upon stretching of the loop, the outer surface thereof flows somewhat in the direction of stretching, and resists the development therein of fissures and other discontinuities.

Turning now to FIGS. 3 and 4 which illustrate how connector loops, such as loop 10, are used, shown at 12, 14, 16 are several of a person's upper front teeth. Indicated generally at 18 is orthodontic apparatus which is connected to these teeth and which functions to exert forces on the teeth to adjust their positions.

Apparatus 18 includes metal bands, or attachments, 20, 22, 24 which are mounted on teeth 12, 14, 16, respectively, with the bands girding the teeth. The bands are anchored in place by any suitable means such as an appropriate cement.

Mounted on bands 20, 22, 24, and facing forwardly therefrom, are brackets 26, 28, 30, respectively. The brackets shown represent only one of many types that are available and which could be used with the invention. Each of the brackets is constructed in substantially the same manner, and considering particularly bracket 28, it includes a pair of laterally-spaced post assemblies 32, 34. Each post assembly includes a pair of spaced posts 32a, 32b which, when viewed from the side as in FIG. 4, appear like a pair of opposed hooks. Between posts 32a, 32b, there is an outwardly facing notch 36, and the hook portions of the posts provide a pair of inwardly facing notches, 38, 40.

Disposed in front of and extending transversely across teeth 12, 14 and 16 is an elongated resilient metal arch wire, 42. Opposite end portions (not shown) of the arch wire are conventionally anchored in place adjacent opposite rear molar teeth of the upper jaw. Where the arch wire passes in front of teeth 12, 14, 16, it is connected to brackets 26, 28, 30 by means of connector loops 44, 46, 48, respectively, which are similar in construction to previously-described loop 10.

Considering particularly the connection of the arch wire and bracket 28 by connector loop 46, the loop has a pair of opposed runs 46a which extend between post assemblies 32, 34, and through inwardly facing notches 38, 40. Loop 46 further includes a pair of opposed stretches 46b, each of which extends over the front of arch wire 42 adjacent one of the post assemblies. With the connector loop mounted in this manner, the same is tensed, and functions to urge the arch wire into the outwardly facing notches 36 between the posts.

It should be noted that prior to any connection being made between the arch wire and bracket 28, the arch wire is preformed whereby, with its ends anchored in place, the portion of the wire passing in front of the bracket is spaced somewhat forwardly of the bracket. This position of the arch wire is illustrated in dashed outline at 42A in FIG. 4. Upon connection of the arch wire and bracket 28, the wire is urged resiliently toward the bracket to the position shown in solid outline where it is received in notches 36 (FIG. 4). Because of the resilient nature of the arch wire, the same tends to return to position 42A, and thus, through connector loop 46, bracket 28 and band 22, it exerts a tractive force on tooth 14 urging the same to a new desired position in the mouth.

The connections made by connector loops 44, 48 between the arch wire and brackets 26, 30, respectively, are similar to the one just described between the arch wire and bracket 28

It should be noted that such connections may be made simply by stretching a connector loop in place over the arch wire and around the posts of a bracket. No tying, ligature manipulation and cutting are required. At each connection the connector loop is tensed, and produces a continually-acting tractive force between the arch wire and the particular bracket.

When it is desired to disconnect the arch wire and a bracket to adjust the former, the connector loop is easily removed intact. Since the loops contemplated are made of a material which retains its elasticity even after long periods of use as compared to rubber bands, a loop may be reused when adjustment of the arch is completed.

Illustrated at 50 in FIG. 5 is another form of tractive device according to the invention. Device 50 includes a pair of spaced connectors, or connector loops, 50a which are joined together by opposite end portions of an elongated, slender filament or tensioning means 50b. Loops 50a and filament 50b are integral, and are formed from the same kind of resinous material as that used to form previously-described connector loop 10. Loops 50a as shown are somewhat similar in configuration to loop 10, and the loops and filament of the device are formed to have relatively smooth nonangular outer surfaces, and substantially circular cross-sectional outlines. Other configurations and cross-sectional outlines are, of course, possible for the device.

Turning to FIG. 6 which illustrates how device 50 may be used with orthodontic apparatus, at 52, 54 are a pair of upper incisor teeth which are spaced a distance B from each other. Anchored on these teeth are metal bands, or attachments, 56, 58 which are similar to previously-described bands 20, 22, 24. Mounted on bands 56, 58 are brackets 60, 62, respectively, which are similar to brackets 26, 28, 30. 64 is a portion of an elongated resilient arch wire similar to earlier-described arch wire 42.

Device 50 is mounted on the apparatus in the manner shown with loops 50a thereof extending about the brackets and over the arch wire, with filament 50b tensed between the loops. Each of the loops of device 50 functions in a manner similar to loops 44, 46, 48 of FIG. 3, in that they are tensed and produced tractive forces urging teeth 52, 54 toward the arch wire. Additionally, filament 50b exerts an intramaxillary tractive force through the brackets and bands on teeth 52, 54 tending to urge the teeth toward one another along the arch wire and close distance B. Thus, device 50 produces several tractive tooth-positioning forces simultaneously.

FIG. 7 illustrates another way in which device 50 may be used, and also illustrates how the device may be used in conjunction with connector loops of the type shown in FIGS. 1-4. Indicated generally at 66, 68 are portions of a person's upper and lower jaws, respectively. The upper jaw is disposed forwardly of the lower jaw by a distance C.

Arch wires 70, 72 are provided for the teeth of jaws 66, 68, respectively, and such wires are connected to brackets on bands anchored to the various teeth. As can be seen the connections between the arch wires and brackets are made by connector loops, 74, 76, which are similar to the previously-described connector loops. These connector loops each produce a tractive force on a tooth urging it toward the arch wire portion disposed in front of the tooth.

Mounted on arch wire 70 is a hook 70a which faces to the left in FIG. 7 and mounted on wire 72 is a similar hook 72a which faces to the right in the figure. As can be seen, hook 72a is located to the right of hook 70a. Device 50 interconnects these two hooks, with connector loops 50a engaging the hooks, and filament 50b tensed between the loops. A similar connection of device 50 to orthodontic apparatus may be made on the other side of a person's mouth.

With device 50 so connected, an intermaxillary tractive force exists between the jaws which urges them in directions to reduce distance C. Thus, the device serves to adjust the relative positions of the jaws.

To suit different circumstances, devices such as device 50 may readily be made in different sizes. Also, while particular types of connections are illustrated herein between the device and orthodontic apparatus, it is appreciated that numerous other types of connections are possible.

Figure 8:
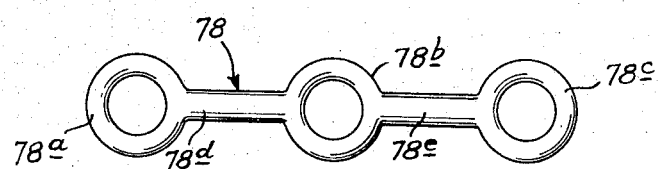
FIG. 8 illustrates a further modified form of tractive device.

In FIG. 8 another modified form of tractive device 78 is shown. Device 78 is somewhat similar to device 50, but includes more than two connectors, or connector loops. In particular, device 78 is shown including three spaced connector loops 78a, 78b 78c. Formed integrally with these loops are interconnecting slender filaments, or tensioning means, 78d, 78e whose opposite end portions are connected to the loops. The loops and filaments of device 78 are formed from a material similar to that used in the previously-described tractive devices, and the cross-sectional outline of loops 78a, 78b, 78c and filaments 78d, 78e is substantially circular. Other cross-sectional outlines, as previously stated are, of course, possible. Also, and as with the earlier mentioned devices, device 78 has a relatively smooth, nonangular nonabrasive outer surface.

Figure 9:
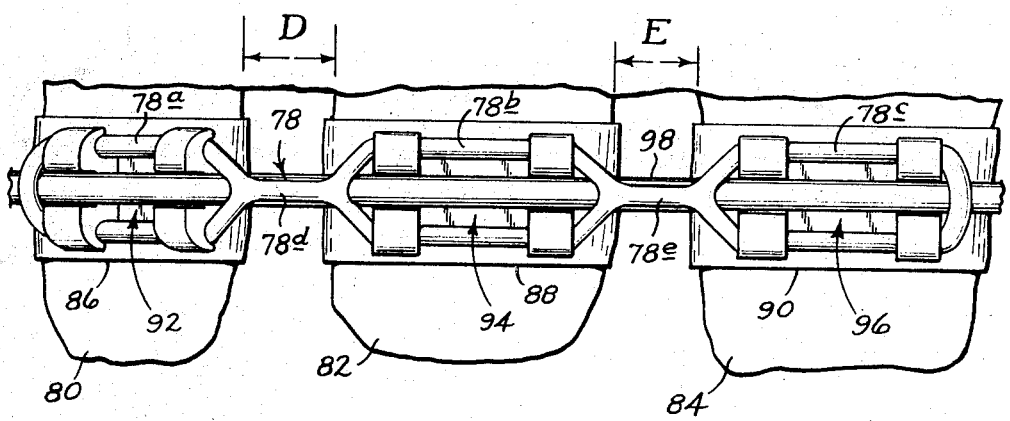
FIG. 9 is a fragmentary side elevation, on the same scale as FIG. 8, illustrating several upper teeth, and showing how the device of FIG. 8 may be used to produce tractive forces simultaneously on such teeth.

FIG. 9 illustrates how device 78 may be used with orthodontic apparatus. In the figure three upper teeth are indicated at 80, 82, 84, with teeth 80, 82 spaced apart a distance D, and teeth 82, 84, spaced apart a distance E. Tooth bands, 86, 88, 90 having brackets 92, 94, 96, respectively, are mounted on teeth 80, 82, 84, respectively. A portion of an elongated resilient arch wire 98 extends transversely across and in front of each tooth.

The arch wire is connected to brackets 92, 94, 96 by loops 78a, 78b, 78c, respectively, of device 78. The loops are tensed, and extend about the brackets and over the arch wire in substantially the same manner as previously described. Filaments 78d, 78e are tensed between loops 78a, 78b and loops 78b, 78c, respectively.

With device 78 thus connected, its loops produce continually-acting tractive forces urging the teeth toward the arch wire, and the filaments produce intramaxillary tractive forces urging the teeth toward one another along the arch wire to reduce distances D, E.

Where it is desired to interconnect more than three teeth in the manner illustrated in FIG. 9, a tractive device similar to device 78 may be employed which has a greater number of connector loops and interconnecting filaments. Devices such as device 78 may readily be made with different cross-sectional areas for the loops and filaments, and with different filament lengths, to accommodate situations requiring different tractive forces.

From the foregoing it will be appreciated that the invention provides novel tractive devices for use with orthodontic apparatus. These devices are formed of an elastomeric resinous material which is highly resistant to mouth-fluids, and to tearing and abrasion. Thus, the devices may be used in a mouth to produce continually-acting tractive forces over extended periods of time without deteriorating to an appreciable degree.

Since no cutting or tying is required to mount and connect a device to orthodontic apparatus, attachment of the device is relatively simple. Furthermore, since the devices are provided with smooth, nonabrasive, nonangular outer surfaces, irritation to mouth tissue is avoided.

While various embodiments of the invention have been described herein, it is appreciated that variations and modifications are possible without departing from the spirit of the invention.

It is claimed and desired to secure by Letters Patent:

1. For use with orthodontic apparatus mounted in a person's mouth, an elastomeric, unitary, mouth-fluid-resistant tractive means for producing a continually acting tractive tooth-positioning force, said tractive means including
at least a pair of spaced-apart endless connector loops, each adapted releasably to be connected to a part of the appartus, and
elongated tensioning means spanning the space between and operatively interconnecting said connector loops, said tensioning means being adapted to urge said connector loop, and the parts of the apparatus to which the connector loops are connected, toward one another.

2. The tractive means of claim 1, wherein said connector loops and tensioning means have relatively smooth, nonangular outer surfaces.

3. The tractive means of claim 1, wherein said tractive means is formed of a thermoset-thermoplastic, polyester-based, isocyanate-terminated, urethane resin.

4. The tractive means of claim 3, wherein said tensioning means comprises an elongated filament having opposite extremities integrally joined to said loops.

5. In combination with orthodontic apparatus including a tooth attachment mounted on a person's tooth, a bracket mounted on said attachment including at least a pair of spaced-apart posts, and an elongated archwire disposed adjacent said bracket with said posts on laterally opposite sides of the archwire;
an elastomeric, unitary, mouth-fluid resistant endless connector loop having relatively smooth, nonangular outer surface, said loop extending as a single strand in a first set of expanses located about the posts on opposite sides of the archwire and in a second set of expanses extending over the archwire which are joined with the first set of expanses, said loop thus releasably interconnecting the archwire and bracket and said sets of expanses of the loop being stretched to have a length exceeding the length they have with the loop in a relaxed state and by reason of such stretched condition being under tension thus to exert a tractive force on the tooth by drawing the archwire toward said bracket.

6. The combination of claim 5, wherein said connector loop comprises a polymeric, isocyanate-terminated, urethane resin resistant to tearing and abrasion.

7. In combination with orthodontic apparatus including at least a pair of tooth attachments, each mounted on a person's tooth, a bracket for each of said tooth attachments, and an elongated archwire disposed adjacent said brackets, an elastomeric, unitary, mouth-fluid-resistant tractive means mounted on said brackets for producing continually a tractive tooth-positioning force, said tractive means comprising an endless connector loop for each of said brackets releasably interconnecting the archwire to the brackets, said tractive means further comprising an elongated tensioning means spanning the space between and operatively interconnecting the connector loops urging the connector loops together.

References Cited

UNITED STATES PATENTS

| | | |
|---|---|---|
| 227,604 | 5/1880 | Witter _____ 24—1.7 |
| 1,945,932 | 2/1934 | Caley _____ 24—1.7 |
| 2,767,469 | 10/1956 | Gladstone _____ 32—14 |
| 2,953,839 | 9/1960 | Kohrn. |
| 3,054,185 | 9/1962 | Weinger _____ 32—14 |
| 3,091,856 | 6/1963 | Goldstein _____ 32—14 |

FOREIGN PATENTS 917,450    2/1963    Great Britain.

ROBERT PESHOCK, Primary Examiner